United States Patent
Ware et al.

(10) Patent No.: US 7,145,499 B2
(45) Date of Patent: Dec. 5, 2006

(54) PRECIPITATION EFFECTS MITIGATION AT ANTENNAE SYSTEMS

(75) Inventors: Randolph Ware, Boulder, CO (US); Fredrick Solheim, Boulder, CO (US); Michael L. Exner, Boulder, CO (US)

(73) Assignee: Radiometrics Corporation, Boulder, CO (US)

(*) Notice: Subject to any disclaimer, the term of this patent is extended or adjusted under 35 U.S.C. 154(b) by 289 days.

(21) Appl. No.: 10/785,286

(22) Filed: Feb. 24, 2004

(65) Prior Publication Data

US 2005/0184740 A1    Aug. 25, 2005

(51) Int. Cl.
G01N 7/00 (2006.01)
G01R 27/04 (2006.01)
G01R 27/32 (2006.01)
H01Q 1/02 (2006.01)

(52) U.S. Cl. .................. 342/26 R; 343/704; 73/29.01; 324/640

(58) Field of Classification Search .............. 342/26 R; 324/640; 73/29.01; 343/704
See application file for complete search history.

(56) References Cited

U.S. PATENT DOCUMENTS 4,873,481 A   10/1989  Nelson et al.
5,065,615 A *  11/1991 Hill .......................... 73/29.01
5,526,676 A    6/1996  Solheim et al.
6,064,344 A *  5/2000  Walton ....................... 343/704

FOREIGN PATENT DOCUMENTS

JP      09138272     *  5/1997

* cited by examiner

Primary Examiner—Dan Pihulic
(74) Attorney, Agent, or Firm—Harold A. Burdick

(57) ABSTRACT

Apparatus and methods for mitigating precipitation effects realized at an antenna system of an instrument such as a microwave radiometer are disclosed. One embodiment of the apparatus includes a blower mechanism that enables instrument operation even during precipitation events (rain, snow, sleet, or excessive condensation) by causing a flow of air at relatively high velocity tangentially across the antenna system. The air flow is of sufficient force to disallow contact by hydrometeors with the antenna or antenna window of the system by redirecting the path of the falling hydrometeors in flight and/or to sweep hydrometeors reaching or formed at the window from the vicinity of the window. Other mechanisms for such precipitation effects mitigation are also disclosed.

21 Claims, 7 Drawing Sheets

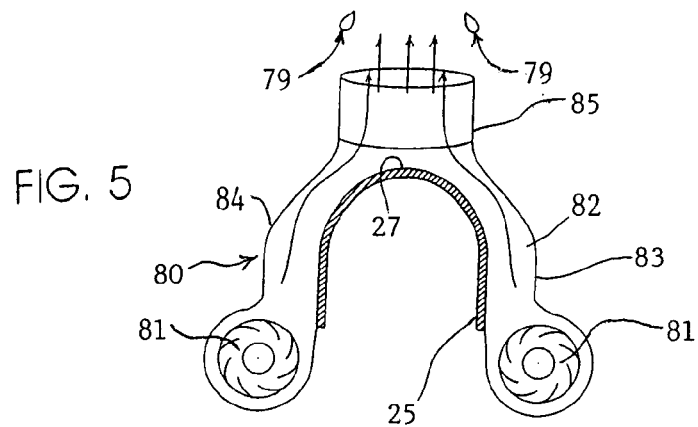
FIG. 5
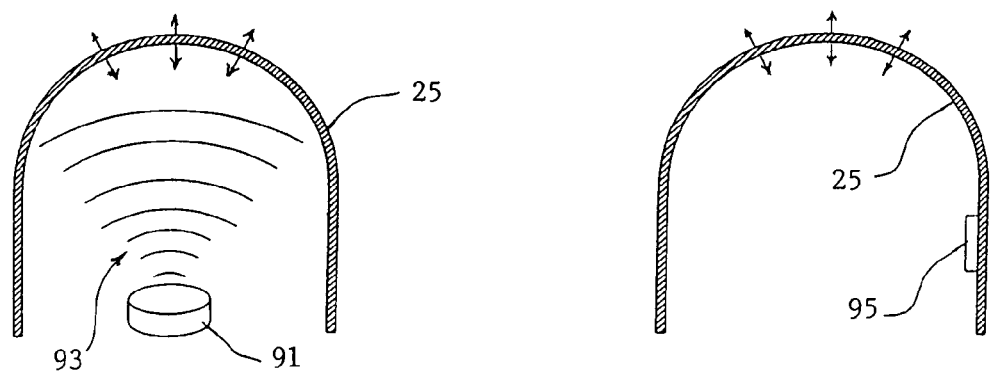
FIG. 6
FIG. 7
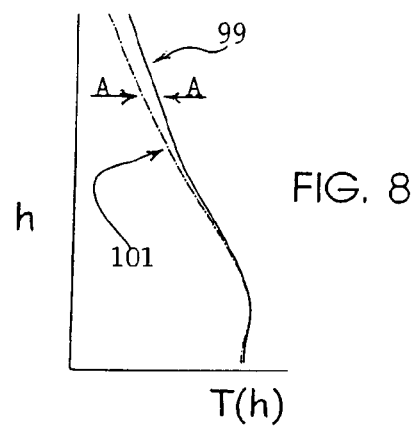
FIG. 8

PRECIPITATION EFFECTS MITIGATION AT ANTENNAE SYSTEMS

FIELD OF THE INVENTION

This invention relates to instruments such as microwave radiometers having antennae systems, and, more particularly, relates to apparatus and methods for addressing the presence of moisture at such antennae systems.

BACKGROUND OF THE INVENTION

Heretofore, operation of microwave radiometers has generally severely degraded during precipitation events because of contamination of the radiometer antenna system by hydrometeors (precipitation particles in liquid, ice, or mixed or wetted phase). Hence, microwave radiometer measurements have not provided meaningful or useful data when made during precipitation events, primarily because liquid water and/or other precipitation products or contaminants on the dielectric window of the antenna system causes erroneously high measurement values. This inability to operate accurately during precipitation events has caused discontinuity of meteorological measurements and inhibited use of microwave radiometers for determination of parameters such as precipitation rates, duration and event location relative to the antenna.

Radiometers have been used for present weather measurements and have been used to feed predictive models on an experimental basis. However, to date, the reliability and accuracy of radiometers during all weather conditions has proven insufficient thereby disqualifying such instruments for significant use as operational weather observation systems. This deficiency has again been primarily due to the contamination of observations due to precipitation on the antenna system, as well as inadequacy in modeling high liquid content during very wet or precipitating conditions, and inadequacy in modeling scattering of microwave radiation from hydrometeors. Therefore, use of microwave radiometers has often been limited to field observation during nonprecipitating periods (or, at best, where conditions of extremely light moisture may be present on the antenna window).

Accouterments for such radiometers have been used or suggested for promoting quick drying of the antenna system after it has become wet, but have not addressed the issues of actual use of the radiometer or other such instrument during precipitation events. One heretofore known device employs a rapidly spinning reflector to throw off precipitation products. This approach, while utilized, has proven problematical due to further contamination from spray and mist created by the system during precipitation events.

It has also been known heretofore to utilize a relatively light air flow from an axial flow fan after a precipitation event to more quickly dry the antenna system (i.e., "dew blowers" used to promote more rapid evaporation of moisture at the antenna window; see U.S. Pat. No. 5,526,676). Systems utilizing light air flow are not, however, intended for use during precipitation events, nor are they effective during such events to enable accurate readings by the radiometer. Moreover, such heretofore known or utilized air flow systems have not been effective across the entire dielectric window (drying the top only while neglecting the sides of the window). Axial flow fans employed by such systems have caused vorticity in the flow, inducing problems at the dielectric window associated with such nonlaminar flow, have been susceptible to back pressure, and have been implemented so that precipitation may be passed through the system and back onto the antenna window.

Use of hydrophobic surface films at the dielectric window have also been heretofore suggested and/or utilized for promotion of beading and runoff of liquid water (see, for example, U.S. Pat. No. 4,873,481). Such hydrophobic surface treatments alone, however, have not proven to be entirely satisfactory.

SUMMARY OF THE INVENTION

This invention provides apparatus and methods for mitigation of precipitation effects realized at an antenna system with or without an antenna window (dielectric windows, covers, protective films, fabrics and the like are included in the term "window" as utilized herein) of an instrument (such as a microwave radiometer) directly exposed to precipitation events, thereby allowing instrument use during precipitation events. The invention employs, alone or in combination, a plurality of mechanisms to mitigate such precipitation effects, including high velocity blowers, vibration inducers, surface treatments, and modeling in software or firmware for corrective purposes.

Apparatus of this invention act adjacent to the antenna system/window with sufficient force to cause movement of the hydrometeors relative to the system/window, and include a mechanism for inducing the movement of the hydrometeors before and/or after hydrometeor contact or formation at the system/window. In a preferred embodiment, the mechanism of the apparatus is a relatively high velocity blower mechanism.

The methods for mitigating effects of hydrometeors presented at an instrument antenna system/window directly exposed to precipitation events of this invention include the steps of sensing hydrometeor presence at the antennae system, indicating a precipitation event, and, responsive thereto, employing at least one mechanism for reliably refining instrument output during the precipitation event.

Enabling accurate microwave radiometer operation during precipitation events allows continuation of meteorological measurements through precipitation events as well as determination of new parameters such as precipitation rates and duration as well as their location relative to the antenna.

It is therefore an object of this invention to provide apparatus and methods for mitigation of precipitation effects realized at an antenna system (with or without an antennae window) of an instrument (such as a microwave radiometer) directly exposed to precipitation events, thereby allowing instrument use during precipitation events.

It is another object of this invention to provide apparatus and methods for mitigation of precipitation effects realized at an antenna system/window of an instrument directly exposed to precipitation events that employs, alone or in combination, a plurality of mechanisms to mitigate such precipitation effects, including high velocity blowers, vibration inducers, surface treatments, and modeling and/or analysis in software or firmware for corrective purposes.

It is still another object of this invention to provide apparatus and methods for mitigation of precipitation effects realized at an antenna system/window of a microwave radiometer directly exposed to precipitation events to enable accurate operation during precipitation events thus allowing continuation of meteorological measurements through the precipitation events as well as determination of new parameters.

It is still another object of this invention to provide, for mitigating effects of hydrometeors presented at an instrument antenna system/window directly exposed to precipitation events, an apparatus acting adjacent to the system/window with sufficient force to cause movement of the hydrometeors relative to the system/window.

It is yet another object of this invention to provide, for mitigating effects of hydrometeors presented at an instrument antenna system/window directly exposed to precipitation events, an apparatus including a mechanism for inducing the movement of the hydrometeors before and/or after hydrometeor contact or formation at the system/window.

It is another object of this invention to provide an apparatus for mitigating effects of hydrometeors presented at an instrument antenna system/window directly exposed to precipitation events, the apparatus including a relatively high velocity blower mechanism acting adjacent to the system/window with sufficient force to cause movement of the hydrometeors relative to the system/window either or both of before and after hydrometeor contact or formation at the system/window.

It is still another object of this invention to provide a method for mitigating effects of hydrometeors presented at an instrument antenna system/window directly exposed to precipitation events that includes the steps of sensing hydrometeor presence at the system/window indicating a precipitation event and, responsive thereto, employing at least one mechanism for reliably refining instrument output during the precipitation event.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 5 is a schematic illustration of a second embodiment of a precipitation effects mitigation mechanism of this invention;

FIG. 6 is a schematic illustration of a third embodiment of a precipitation effects mitigation mechanism of this invention;

FIG. 7 is a schematic illustration of a fourth embodiment of a precipitation effects mitigation mechanism of this invention;

FIGS. 8 and 9 illustrate a fifth embodiment of a precipitation effects mitigation mechanism of this invention.

DESCRIPTION OF THE INVENTION

Figure 1:
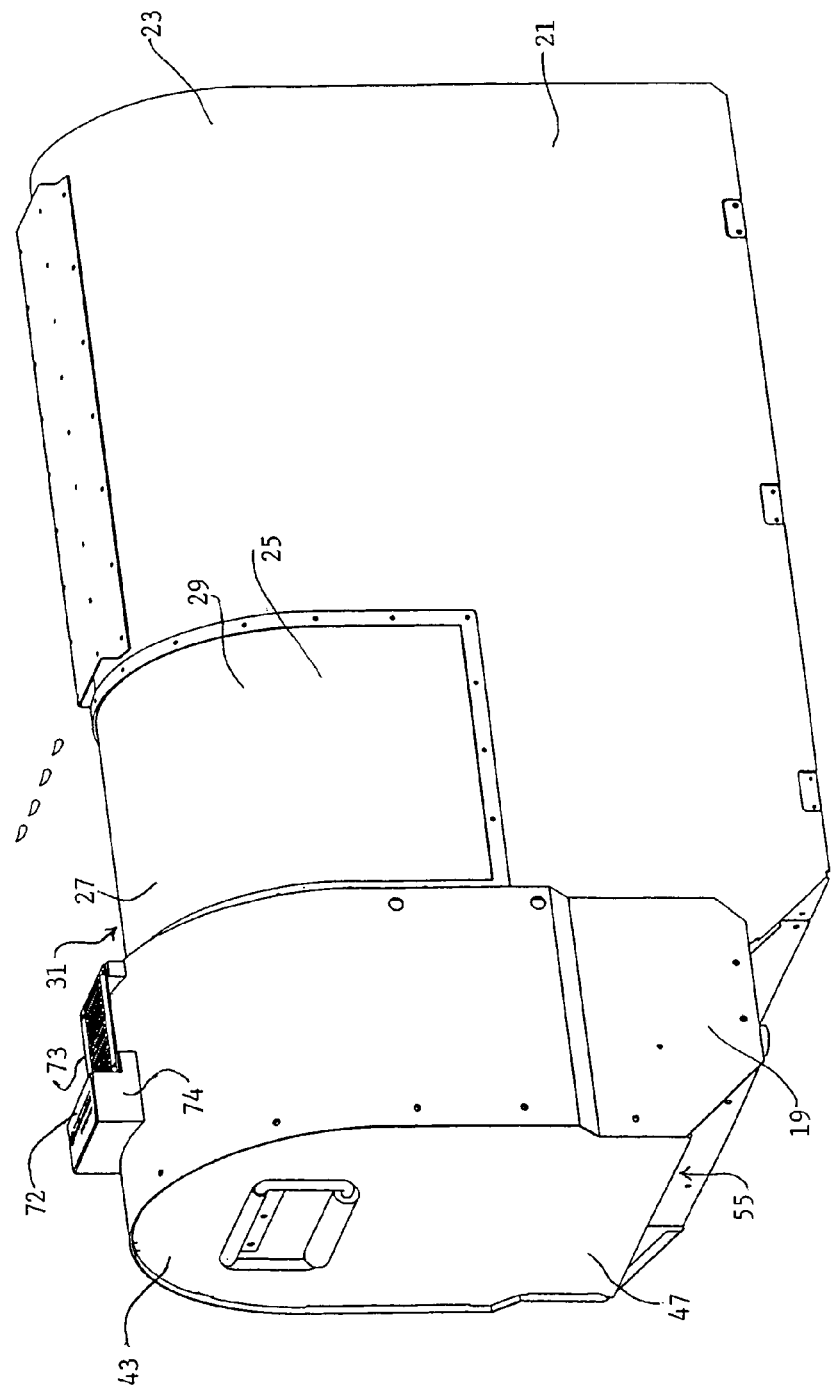
FIG. 1 is a perspective view of a microwave radiometer utilizing a first embodiment of a precipitation effects mitigation apparatus of this invention in association therewith including a high velocity blower mechanism.

A first embodiment of an apparatus 19 for mitigating precipitation effects is shown in FIGS. 1 through 4 in association with microwave radiometer 21. As is known, microwave radiometer 21 includes an instrument housing 23 having an antenna system with a window 25 thereat. For use in a radiometer, window 25 (a radome having both upper surface 27 and lateral, or side, surfaces 29 and 31) is preferably formed from material which is nearly transparent to the broad band microwave signals of interest (Teflon, for example). Housing 23 protects the instrument and antennae (a radiometer with feed horn antennae of known configuration, for example) from the elements.

It should be appreciated that when the term "window" or "dielectric window" is utilized herein, any part of an antenna system in an instrument utilized to protect the actual antenna of the instrument in intended within the scope of such terminology, irrespective of type (dielectric windows, covers, protective films, fabrics and the like are included) or material utilized in construction thereof (though non-conductive materials are most typical and clearly intended when the term "dielectric" is utilized).

FIGS. 2 through 5 illustrate various blower mechanism embodiments of the apparatus of this invention. It should be understood that these embodiments may be usefully employed for precipitation effects mitigation with any antenna system of a related instrument, the system including an antenna window or not (in systems having an exposed antenna), even though the embodiments shown herein as the description proceeds illustrates their use with an instrument having an antenna window.

Figure 2:
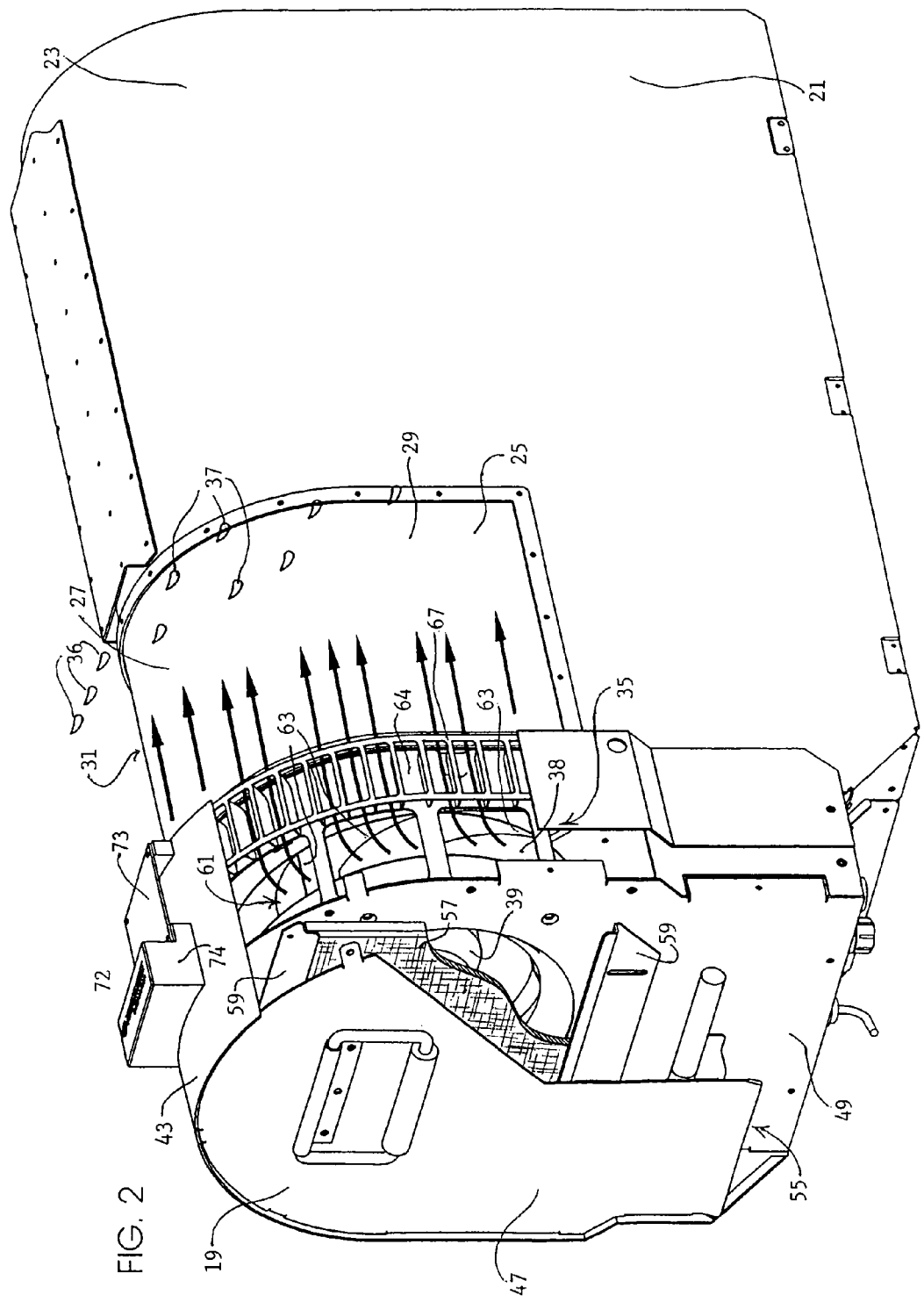
FIG. 2 is a perspective view of the radiometer and apparatus of FIG. 1 having portions cut away.
Figure 3:
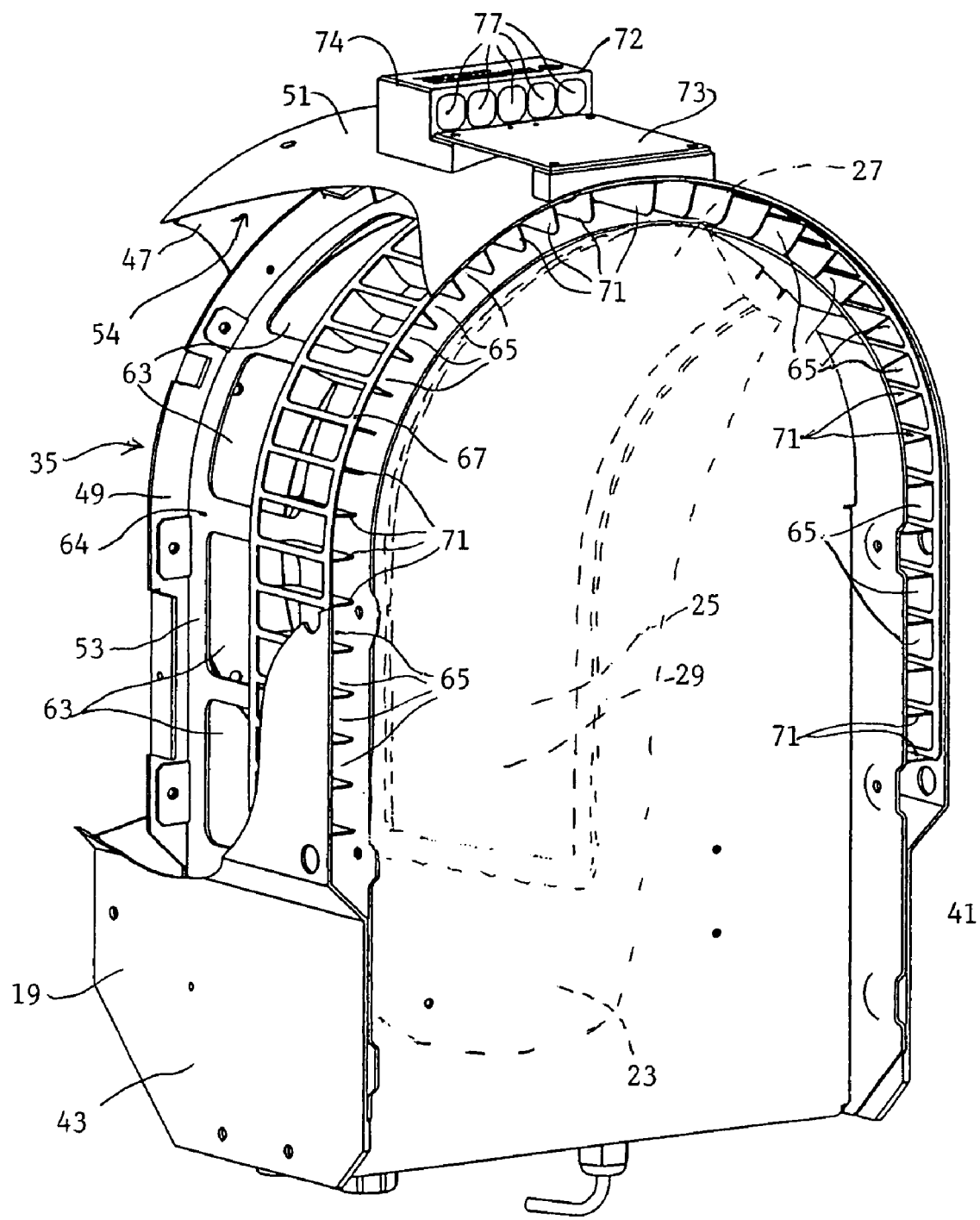
FIG. 3 is a perspective view of the apparatus of FIG. 1 having a portion of the housing cut away.
Figure 4:
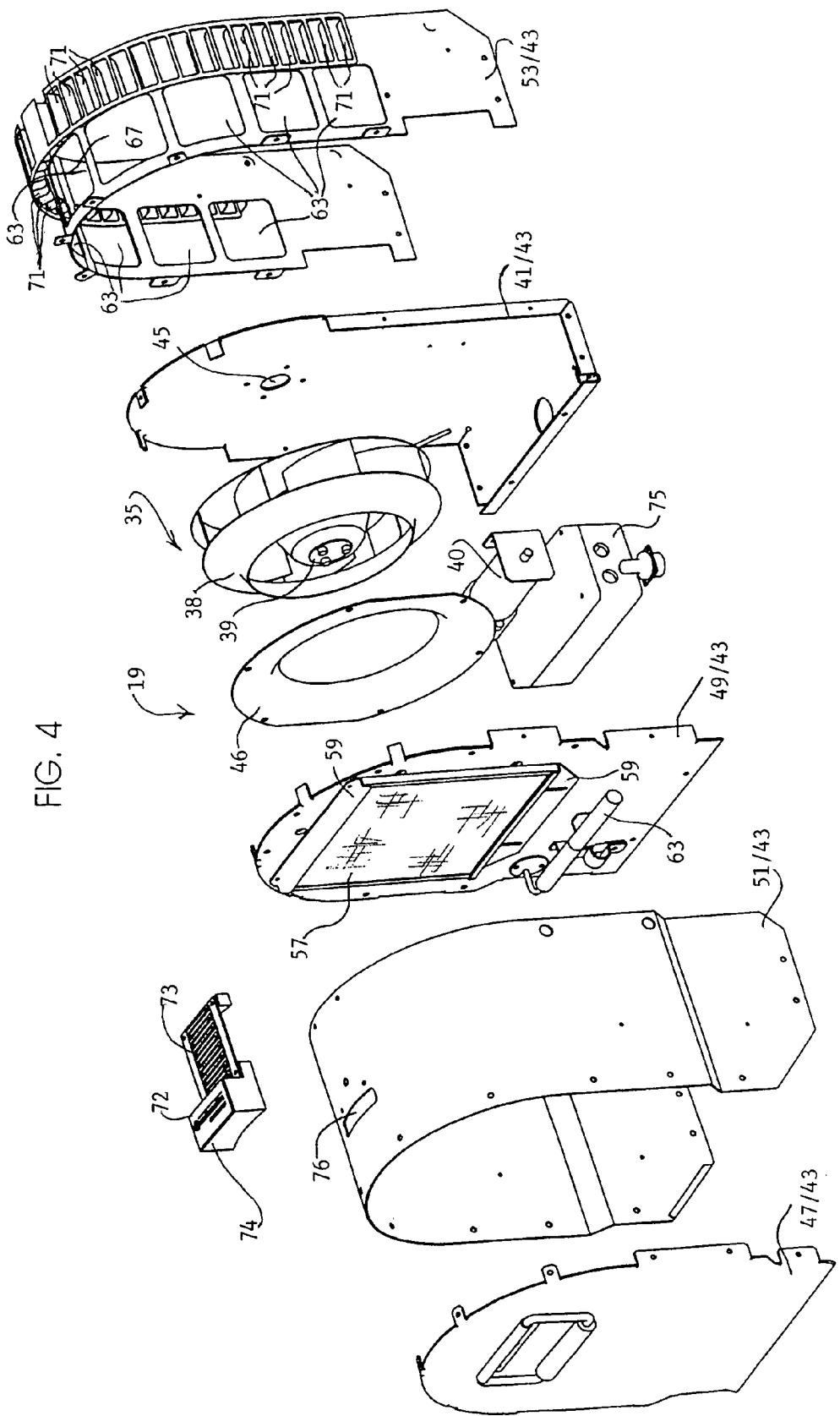
FIG. 4 is an exploded view of the apparatus as shown in FIG. 3.

As shown in FIGS. 2 through 4, apparatus 19 includes high air flow blower mechanism 35 that enables microwave radiometer 21 operation even during precipitation events (rain, snow, sleet, or excessive condensation) by causing a flow of air at relatively high velocity (relative to known low velocity "dew blowers") tangentially across dielectric antenna window 25. The air flow is of sufficient force to disallow contact by hydrometeors 36 with window 25 (i.e., by redirecting the path of the falling hydrometeors in flight) and/or to sweep hydrometeors 37 reaching or formed at window 25 from the vicinity of the window.

Blower mechanism 35 includes a blower having centrifugal fan 38 mounted to fan motor (or impeller) 39 to maintain high flow through constrictions and/or out directing nozzles. Motor 39 is coupled to capacitor 40 (used conventionally for starting brushless motors), and is mounted to front and bottom wall member 41 of housing 43 conventionally at mount 45 thereat, blower shield 46 mounted conventionally forward of impeller 39.

Housing 43 further includes rear wall member 47, forward duct wall and filter mount wall member 49, top wall member 51, and outlet wall member 53 assembled as illustrated in the drawing using rivets or the like. Air duct 54 (FIG. 3) is defined through the housing from inlet 55 defined between rear wall member 47, forward duct wall member 49 and top wall member 51, through an opening (not shown) in wall member 49 having filter screen 57 mounted thereover on adjustable mounting brackets 59, into fan chamber 61 defined between wall members 49, 41 and 51 (FIG. 2), and through passageways 63 in outlet wall member 53 to air outlet chamber 64 (FIGS. 2 and 3) having outlets 65 thereat defined by wall members 49, 51 and 53.

Air duct 54 is vertically disposed at the section thereof between wall members 47 and 49 so that inlet 55 is disposed downwardly (and thus sheltered to prevent the introduction of precipitation through the inlet). Temperature/relative humidity sensor 66 of instrument 21 may conveniently be housed adjacent to inlet 55 of duct 54, mounted on wall member 49, for example.

While a variety of constrictions and/or out directing nozzles could be utilize to maintain laminar flow across window 25, air flow directing structure 67 at wall member 53 is preferred for directing the relatively high velocity flow of air tangentially across both upper and lateral surfaces 27/29/31 of the radome. Air flow directing structure 67 is an arcuate lattice having a plurality of flow directing fins 71 arrayed thereabout for promoting laminar air flow through outlets 65 across the radome/window surfaces (it should be understood that other structures could be utilized to accomplish this result).

Apparatus 19 further includes sensor 72 for sensing the likelihood of hydrometeor presence at window 25. Sensor 72 includes precipitation detector 73 and air flow directing module 74. Detector 73 is preferably configured as a detector board having a plurality of conductive pathways formed across the top surface thereof (a closed circuit formed when precipitation creates a conductive loop across adjacent pathways thereby activating blower motor 39 via controller 75 connected between detector 73 and motor 39). Air flow directing module 74 is in communication with fan chamber 61 of duct 54 through opening 76 in wall member 51 (FIG. 4). Air flow outlets 77 direct a transverse flow of air across the top surface of detector board 73, but are of a relatively large overall opening area compared to opening 76 thereby significantly lowering air flow velocity therefrom. In this way, hydrometeors are allowed to contact the surface of detector 73 (as required for the sensor to function), but faster drying after cessation of a precipitation event is promoted (so that sensor 72 also causes deactivation of fan motor 39 relatively contemporaneously with event cessation).

Another embodiment of this invention including a mechanism promoting relatively high velocity air flow at window 25 is shown in FIG. 5. In this embodiment, a flow of dry air is directed angularly away from the surface of window 25 (vertically, for example, as shown in the FIGURE) to prevent precipitation from reaching the window (i.e., deflecting hydrometeors 79 that are falling toward the window). As illustrated, blower mechanism 80 is provided including blowers 81 and air flow directing duct 82 including duct portion 83/84 and duct outlet 85 for directing a relatively high velocity flow of air angularly away (substantially perpendicularly, for example) from upper surface 27 of window 25. Duct 82 is illustrative only, it being understood that any means of containing or causing air flow with sufficient velocity could be utilized.

Hydrophobic materials may be usefully employed in all embodiments of the various mechanisms of the invention as disclosed herein, either as antenna windows themselves or as coatings or covers to repel precipitation and/or promote beading. Chemical coatings such as fluorourethanes, fluorosilanes, and other fluoropolymers and low surface energy compounds could be utilized (for example, CYTONIX, VELLOX, TEFLON, TELGAR, silicones, or the like). Such hydrophobic coatings can be either a thin film placed over the dielectric window or applied as a liquid (either by aerosol or brush).

Another embodiment of an apparatus of this invention in FIGS. 6 and 7 includes mechanisms for inducing vibrations at window 25 (utilizing, for example, pulsating or sonic/acoustic vibrations of the window) to drive off precipitation. Such vibration can promote separation of precipitation from the surface of window 25 and/or fracture hydrometeors into smaller fragments such that associated mitigation structure (hydrophobic coatings or films, airflow or the like as discussed herein) is more effective in transporting them away from the surfaces of window 25. FIG. 6 shows use of acoustic transducer 91 wherein acoustic waves 93 cause vibration at window 25. FIG. 7 illustrates use of transducer 95 mechanically connected at window 25 for inducing such vibration.

Since the capability to collect uncontaminated radiometer data during precipitation events is achieved utilizing the mitigation mechanisms described herein, it is possible to translate observed microwave radiation into information on heretofore unavailable meteorological information such as rate, location, and duration of rain and other types of precipitation and other meteorological phenomena occurring during precipitation events. These methods include radiative transfer modeling including emission, absorption, and radiation scattering in atmospheres of high water content and atmospheres containing hydrometeors of all phases, sizes, and shapes.

Inclusion of radiative scattering in radiative transfer modeling mechanisms in accord with this invention, including the effects of radiation being scattered from hydrometeors, will improve, or may even correct, instrument performance in the presence of hydrometeors. While the modeling mechanisms herein may be effective alone to mitigate the effects of precipitation at the antenna system, they can also be advantageously employed to refine instrument measurements in combination with the other mitigation mechanisms discussed above. Moreover, it should be understood that these mechanisms may be usefully employed for precipitation effects mitigation with any antenna system of a related instrument, with an antenna window or without.

Figure 9:
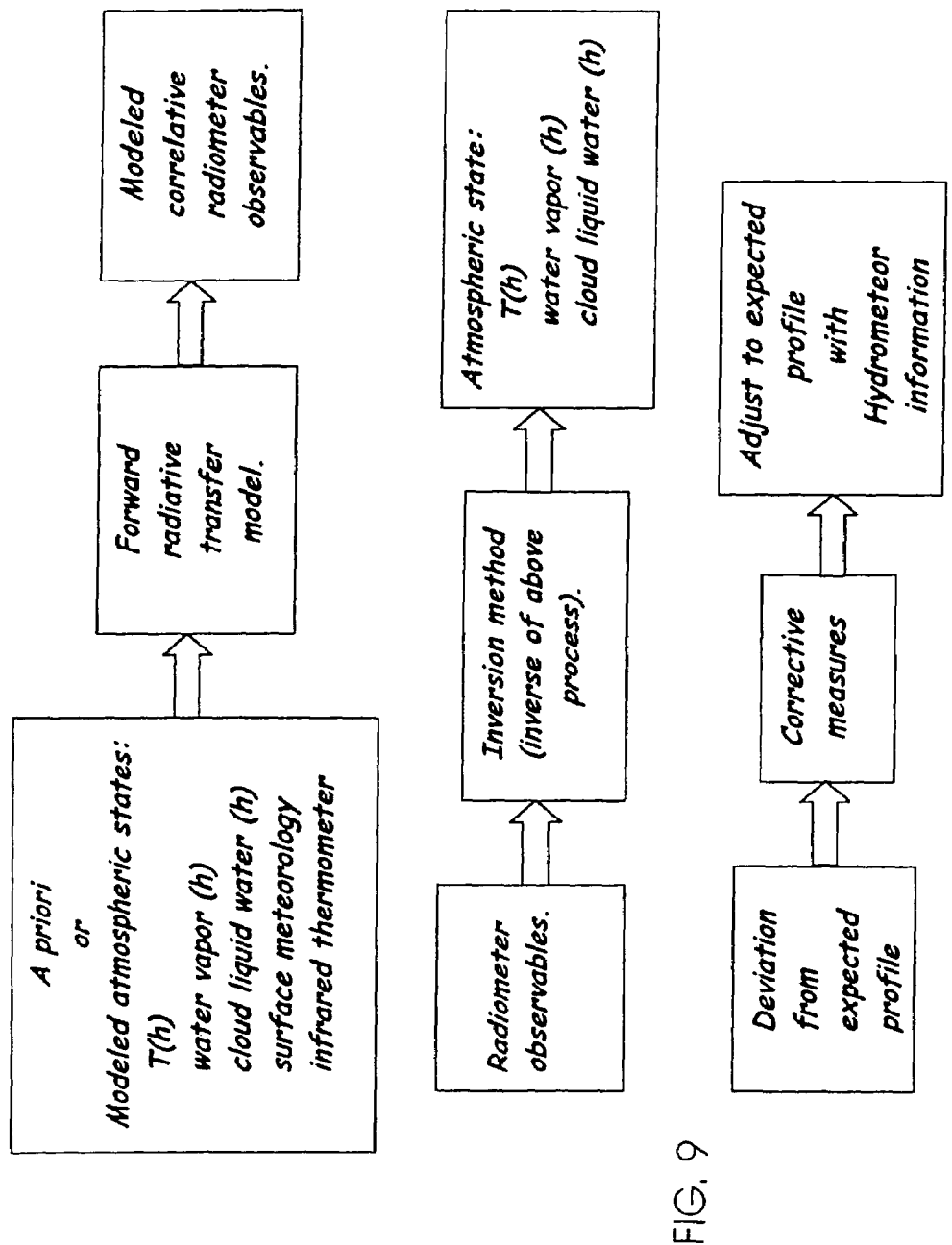

Turning to FIGS. 8 and 9, one method of determining meteorological parameters from radiometer observations (called "retrieval" of the parameters) utilizes a priori or otherwise generated atmospheric states, then modeling (calculating) therefrom resultant microwave radiation that is observed by the radiometer. These cases are then inverted by mathematical methods, such as linear regression, artificial neural networks, Bayesian and maximum likelihood, and other mathematical methods. Because weather nowcasting and forecasting microwave radiometers generally do not yield usable observations in the presence of hydrometeors, effects of radiation being scattered by hydrometeors have not heretofore been included in such radiative transfer models.

FIG. 8 is an exemplary illustration of a temperature profile 99 retrieved by a radiometer during a precipitation event without utilizing precipitation effects mitigation as compared with data profile 101 from other sources (from climatology, radiosondes, satellite soundings, or other sources). A temperature profile is used for illustration herein, the discussion pertaining as well to other atmospheric profiles and readings obtainable utilizing a microwave radiometer. Utilizing of the deviation A—A of retrieved temperature profile 99 from profile 101, the retrieved temperature profiles can be adjusted by adding a population of hydrometeors into the modeled atmosphere until the expected result is attained, thereby determining the hydrometeor population. Since the scattering from hydrometeors causes such deviation, correctly modeling the hydrometeor population can remove this deviation, thereby allowing refinement of gathered information and determining information on the hydrometeor population.

FIG. 9 illustrates a modeling mechanism of this invention utilizing modified radiative transfer models so that radiometer observations during high liquid water events can yield accurate measurements of temperature, water vapor, and cloud liquid profiles and precipitation by a microwave radiometer. Training or developing the retrieval method, utilizing ANN (Artificial Neural Network), linear regression, Bayesian, and/or model-based physical retrievals, for example yields modeled correlative radiometer observables. This is the first of two steps in retrieval of meteorological information on the atmosphere. The second step is the operational use of the retrieval method wherein the radiometric and ancillary observables (real time observations by the radiometer) are converted ("inverted") back into meteorological parameters.

Thereby, correction of the deviation from the expected profile may be undertaken. Hydrometeors scatter microwave radiation because of their size relative to the microwave wavelength, and inclusion of these scattering effects into the retrieval methodology allows determination of other information, particularly related to hydrometeor size.

Figure 10:
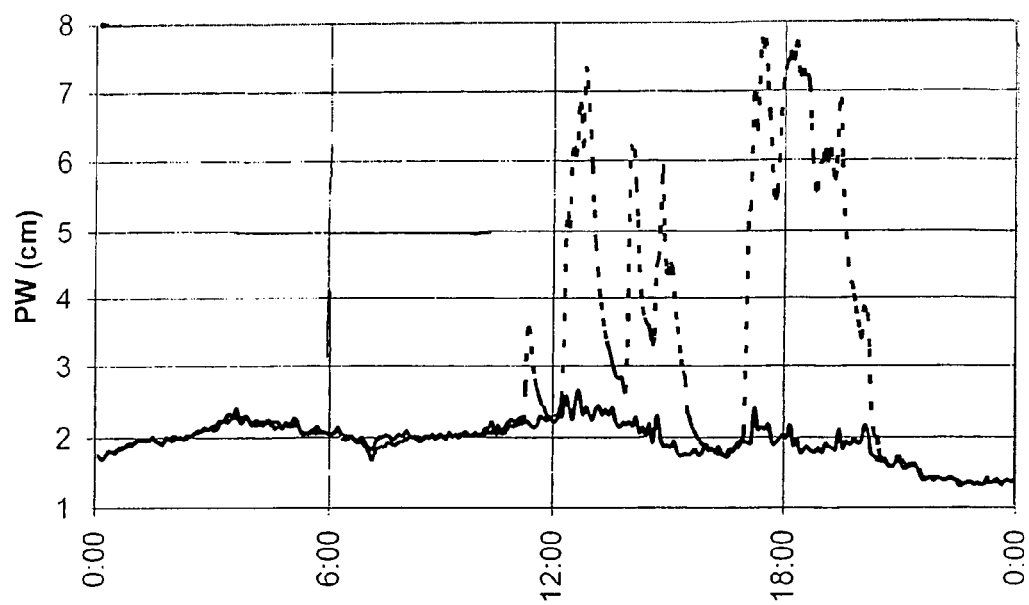
FIGS. 10 and 11 display data illustrating performance of a microwave radiometer utilizing precipitation effects mitigation during precipitation events.
Figure 11:
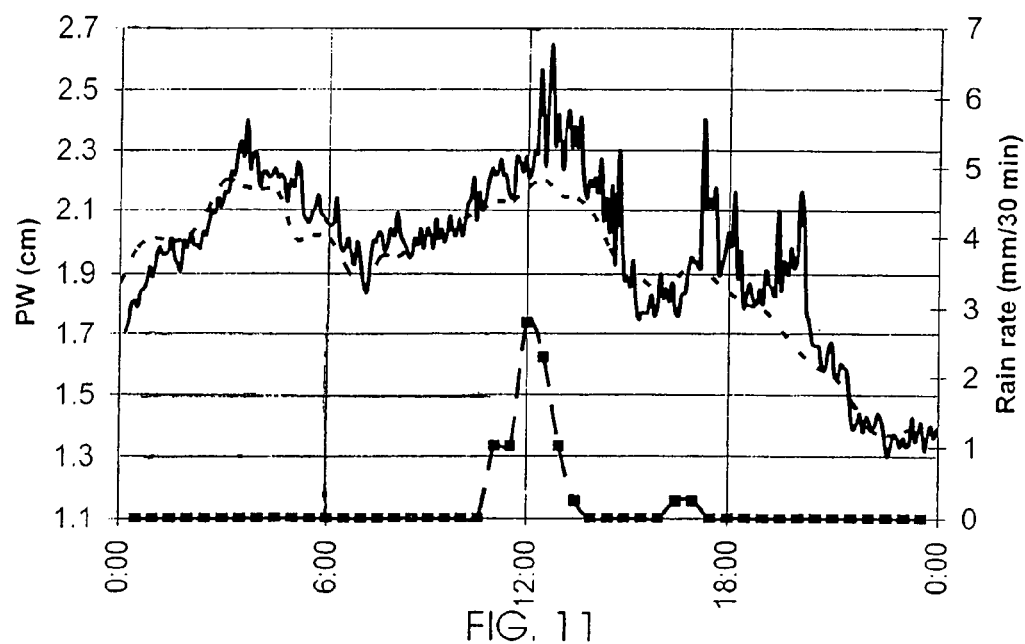

FIGS. 10 and 11 illustrate how use of precipitation effects mitigation such as that disclosed herein during a precipitation event can dramatically improve accuracy of data gathered during such event. FIG. 10 shows precipitable water retrievals from radiometers at the same location with (solid line) and without (dashed line) mitigation. FIG. 11 is a comparison of precipitable water retrievals from the same radiometer using precipitation effects mitigation as shown in FIG. 10 (same rain events, different scale—solid line) with 30 minute averages of ground-based GPS measurements (dashed line). The rain rate measured by a tipping bucket rain gauge at the same location is also shown (link line at bottom). It is apparent that data gathering accuracy is greatly improved by use of precipitation effects mitigation and correlates well with traditional ground based measurements during the rain events shown in the two FIGURES.

As may be appreciated from the foregoing, instruments such as microwave radiometers, heretofore not utilizable during precipitation events due to contamination of the antenna window by hydrometeors and inaccurate measurements caused thereby, may now be employed during precipitation events using the various effects mitigation mechanisms, apparatus and methods disclosed herein. Such increased reliability under all ambient conditions greatly improves the utility of such instruments for weather data gathering and the like.

What is claimed is:

1. For mitigating effects of hydrometeors presented at an instrument antenna system directly exposed to precipitation events, an apparatus comprising:
    a mechanical mechanism acting adjacent to the system with sufficient force to cause movement of the hydrometeors relative to the system; and
    a corrective model mechanism including characterization of radiation being emitted by and scattered from hydrometeors for further refining instrument performance in the presence of hydrometeors.

2. The apparatus of claim 1 wherein said mechanical mechanism includes a relatively high velocity blower.

3. The apparatus of claim 1 wherein the system includes an antenna window, said mechanical mechanism including means for inducing said movement of the hydrometeors either or both of before and after hydrometeor contact or formation at the window.

4. The apparatus of claim 3 wherein said apparatus further includes a hydrophobic material applied to the window.

5. The apparatus of claim 1 wherein said mechanical mechanism includes means for causing vibration at the window.

6. The apparatus of claim 1 wherein said model mechanism includes a retrieval method development stage, a retrieval method use stage, and a correction stage.

7. An apparatus for mitigating effects of hydrometeors presented at an instrument antenna window having both upper and lateral surfaces directly exposed to precipitation events, said apparatus comprising:
    a relatively high velocity blower mechanism acting adjacent to the window with sufficient force to cause movement of the hydrometeors relative to the window either or both of before and after hydrometeor contact or formation at the window, said blower mechanism including a blower located adjacent to an air flow directing means for directing a relatively high velocity flow of air tangentially across both the upper and lateral surfaces of the window.

8. The apparatus of claim 7 further comprising a sensor for sensing the likelihood of hydrometeor presence at the window, said sensor and said blower mechanism operatively associated so that operation of said blower mechanism begins when likely hydrometeor presence at the window is sensed by said sensor.

9. The apparatus of claim 8 wherein said blower mechanism includes means for directing air flow tangentially across a detecting surface of said sensor.

10. The apparatus of claim 7 further comprising a housing configured for securement to the instrument adjacent to the window and defining a duct of said directing means having an air inlet and air outlet on opposite sides of said blower.

11. The apparatus of claim 10 wherein said air inlet is vertically disposed opening downwardly during normal instrument use.

12. The apparatus of claim 7 wherein said air flow directing means includes an arcuate structure having a plurality of fins for promoting laminar air flow across the radome surfaces.

13. The apparatus of claim 7 wherein said blower mechanism includes a centrifugal fan.

14. The apparatus of claim 7 wherein said blower mechanism includes a blower and an air flow directing means for directing a relatively high velocity flow of air angularly away from a surface of the window.

15. The apparatus of claim 7 further comprising a vibration inducing mechanism one of attached or located adjacent to the window.

16. The apparatus of claim 7 further comprising a hydrophobic material applied to the window.

17. A method for mitigating effects of hydrometeors presented at an instrument antenna system directly exposed to precipitation events comprising the steps of:
    sensing hydrometeor presence at the system indicating a precipitation event; and
    modeling radiative transfer, including effects of radiation being emitted by and scattered from hydrometeors.

18. The method of claim 17 further comprising removing precipitation at the antenna system to thereby refine instrument output during the precipitation event responsive to the sensing of hydrometeor presence at the system, wherein the step of removing precipitation includes at least one of the step of inducing movement of the hydrometeors either or both of before hydrometeor contact at the antenna system and after hydrometeor contact or formation at the antenna system and the step of causing vibration at a part of the system.

19. The method of claim 17 wherein the step of modeling radiative transfer includes the steps of developing a retrieval method, using said retrieval method to convert observables to meteorological parameters, and estimating hydrometeor population from deviations noted thereby.

20. The method of claim 19 further comprising the step of employing a corrective mechanism for refining instrument performance in the presence of hydrometeors based at least in part on estimated hydrometeor population.

21. The method of claim 18 wherein the antenna system includes a window having upper and lateral surfaces, and wherein the step of inducing movement of the hydrometeors includes the step of directing a relatively high velocity flow of air tangentially across both the upper and lateral surfaces of the window.

* * * * *